(12) United States Patent
Wehrs

(10) Patent No.: US 12,444,594 B2
(45) Date of Patent: Oct. 14, 2025

(54) GAS VALVES FOR ION GUIDES

(71) Applicant: Thermo Fisher Scientific (Bremen) GmbH, Bremen (DE)

(72) Inventor: Henning Wehrs, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 331 days.

(21) Appl. No.: 17/611,095

(22) PCT Filed: May 19, 2020

(86) PCT No.: PCT/EP2020/064007
§ 371 (c)(1),
(2) Date: Nov. 12, 2021

(87) PCT Pub. No.: WO2020/234320
PCT Pub. Date: Nov. 26, 2020

(65) Prior Publication Data
US 2022/0230863 A1    Jul. 21, 2022

(30) Foreign Application Priority Data

May 21, 2019 (GB) ...................... 1907171

(51) Int. Cl.
*H01J 49/06* (2006.01)
*F16K 1/20* (2006.01)
(Continued)

(52) U.S. Cl.
CPC .......... *H01J 49/063* (2013.01); *F16K 1/2007* (2013.01); *H01J 49/005* (2013.01);
(Continued)

(58) Field of Classification Search
CPC .... H01J 49/0077; H01J 49/022; H01J 49/065; H01J 49/067; H01J 49/068; H01J 49/105;
(Continued)

(56) References Cited

U.S. PATENT DOCUMENTS 2,939,952 A    6/1960 Wolfgang et al.
5,941,501 A    8/1999 Biegelsen et al.
(Continued)

OTHER PUBLICATIONS

PCT/EP2020/064004, International Search Report and Written Opinion, Oct. 13, 2020, 20 pages.
(Continued)

*Primary Examiner* — David E Smith

(57) ABSTRACT

An ion optical arrangement (1) for use in a mass spectrometer comprises electrodes (11) defining an ion optical path, a housing (18) for accommodating the electrodes, a voltage source for providing voltages to the electrodes to produce electric fields, and a valve for allowing gas to enter and/or leave the housing. The valve comprises an electrostatic mechanism and/or a pneumatic mechanism. The electrostatic mechanism may comprise a flexible foil (30, 31) configured for covering at least one opening (16) in the ion optical arrangement when a first voltage is applied and being spaced apart from the at least one opening when a second voltage is applied. The pneumatic mechanism may comprise a Bourdon tube.

6 Claims, 3 Drawing Sheets

(51) Int. Cl.
*H01J 49/00* (2006.01)
*H01J 49/02* (2006.01)
*H01J 49/10* (2006.01)
*H01J 49/42* (2006.01)

(52) U.S. Cl.
CPC ........ *H01J 49/0077* (2013.01); *H01J 49/022* (2013.01); *H01J 49/065* (2013.01); *H01J 49/067* (2013.01); *H01J 49/068* (2013.01); *H01J 49/105* (2013.01); *H01J 49/421* (2013.01); *H01J 49/4215* (2013.01)

(58) Field of Classification Search
CPC .... H01J 49/421; H01J 49/4215; H01J 49/063; F16K 1/2007; F16K 7/12
See application file for complete search history.

(56) References Cited

U.S. PATENT DOCUMENTS

| | | | |
|---|---|---|---|
| 6,140,638 A | 10/2000 | Tanner et al. | |
| 6,534,764 B1 | 3/2003 | Verentchikov et al. | |
| 7,195,393 B2 * | 3/2007 | Potter | F16K 99/0007 366/127 |
| 9,842,730 B2 * | 12/2017 | Schoen | H01J 49/421 |
| 2003/0234376 A1 * | 12/2003 | Cabuz | F15C 5/00 251/129.01 |
| 2007/0138383 A1 * | 6/2007 | Dowell | H01J 49/0072 250/281 |
| 2008/0128611 A1 * | 6/2008 | McLuckey | H01J 49/0072 250/281 |
| 2008/0217526 A1 | 9/2008 | Colby et al. | |
| 2009/0134324 A1 | 5/2009 | King et al. | |
| 2011/0012017 A1 | 1/2011 | Nishiguchi | |
| 2011/0210241 A1 | 9/2011 | Badiei et al. | |
| 2013/0284917 A1 | 10/2013 | Badiei et al. | |
| 2015/0102215 A1 | 4/2015 | Jung et al. | |
| 2015/0235827 A1 | 8/2015 | Bazargan et al. | |
| 2016/0027633 A1 | 1/2016 | Jung et al. | |
| 2018/0102239 A1 | 4/2018 | Schoen et al. | |
| 2018/0286659 A1 | 10/2018 | Guna | |

OTHER PUBLICATIONS

PCT/EP2020/064005, International Search Report and Written Opinion, Aug. 24, 2020, 17 pages.
PCT/EP2020/064007, International Search Report and Written Opinion, Oct. 9, 2020, 23 pages.
Shikida M et al., "Electrostatically Driven Gas Valve with High Conductance", Journal Of Microelectromechanical Systems, IEEE Service Center, vol. 3, No. 2, Jun. 1, 1994 (Jun. 1, 1994), pp. 76-79, XP000459055, ISSN: 1057-7157, DOI: 10.1109/84.294324.

* cited by examiner

GAS VALVES FOR ION GUIDES

FIELD OF THE INVENTION

The present invention relates to isotope ratio mass spectrometry (MS). More in particular, the present invention may relate to interference free, high resolution, multi-collector isotope ratio mass spectrometry and elemental analysis, for example in combination with a collision cell and a plasma source, such as an inductively coupled plasma (ICP) source.

BACKGROUND OF THE INVENTION

Multi-collector ICP-MS is an established method for high precision and accurate isotope ratio analysis. Applications are in the field of geochronology, geochemistry, cosmochemistry, biogeochemistry, environmental sciences as well as in life sciences. Precise and accurate isotope ratio measurements very often provide the only information to gain deeper insight into scientific questions which cannot be answered by any other analytical technique. However, elemental and molecular interferences in the mass spectrometer limit the attainable precision and accuracy of the analysis.

These interferences are present in the sample material itself or are generated by sample preparation from a contamination source (used chemicals, cleanliness of sample container, and fractionation during sample purification) or are even generated in the ion source or in the mass spectrometer. The problems with such interferences can be countered by:
1. using a high mass resolution mass analyzer that discriminates against interferences by detecting small differences in mass of the interference relative to the sample ion;
2. by sample preparation and chemical separation of interference prior to mass analysis; and/or
3. by using a collision cell integrated into the mass analyzer.

In a collision cell the chemical interferences are removed by chemical reactions, or by kinetic energy discrimination, taking advantage of different cross sections of molecular and elemental species inside the pressurized collision cell which results into different kinetic energy losses of molecular and elemental ions. By means of a high pass energy filter following the collision cell the lower energy molecular species can be discriminated.

A collision cell is an encapsulated volume within the ion optical beam path which is pressurized with a collision gas to cause interactions (i.e. collisions and/or chemical reactions between the ions and the gas molecules). In order to generate efficient collisions and chemical reactions inside the collision cell, the ions preferably are at a low ion beam energy of a few electronvolt (eV) only. The collision cell usually is a multipole ion guide which is powered by RF fields to guide the ions through the collision cell. In order to achieve a reasonable gas pressure, the multipole ion guide is encapsulated in a compact volume with small entrance and entrance apertures, typically in the range of 1-3 mm diameter. A collision cell coupled to a multi-collector mass spectrometer is disclosed in British patent application GB 2 546 060 (Thermo Fisher Scientific (Bremen) & The University of Bristol).

Ions having different masses but the same energy travel at different velocities through the time dependent oscillating field of the collision cell and as a result the ion trajectories are mass dependent. In other words, the trajectories depend on the mass of the ions traveling through the RF field. This effect is called "noding". This can in particular pose a problem at the exit of the multipole structure, where ions of different masses may exit at different angles.

The mass dependence of the collision cell transmission can be a problem for accurate isotope ratio measurements, even when it is small. However, for some analytical applications there is no other choice to remove isobar interferences but to use the collision cell.

For samples where no interferences are present it would be advantageous to avoid the low energy passage of the ions through the radio frequency (RF) multipole collision cell optics and to exclude any uncertainty of the discrimination effects caused in the collision cell (i.e. chemical effects as well as the noding effect).

It is noted that the undesired "noding effect" is not limited to collision cells but may also occur in other ion optical arrangements, such as mass filters.

One way to solve this problem is to install a second beam path in the mass spectrometer where the ion beam is deflected off axis prior to the collision cell to bypass the collision cell and finally to deflect the ions back onto the optical axis of the mass spectrometer. Such a dual path ion optics arrangement is described in British patent application GB 2 535 754 (Nu Instruments). It allows to switch between the low energy collision cell beam path and an off axis static high energy beam path. This results into a rather complicated setup with several ion beam deflectors causing image aberrations and alignment problems.

SUMMARY OF THE INVENTION

It is an object of the present invention to provide an ion optical arrangement, such as a collision cell or a mass filter, for a mass spectrometer which can largely avoid the noding problems related to existing RF driven ion optics and which is simpler and more compact than the dual path arrangement of the prior art. This object may be achieved by a collision cell which has two operating modes: a pressurized mode in which a collision gas is present, and a vacuum mode in which substantially no collision gas is present. However, this requires a rapid switching between the two modes, and therefore a rapid pressurizing and emptying of the collision cell. This in turn requires a valve that can operate very quickly and efficiently.

It is therefore a further object of the present invention to provide a valve for use in an ion optical arrangement, such as but not limited to a collision cell, which valve can be switched very rapidly.

Accordingly, the present invention provides an ion optical arrangement for use in a mass spectrometer, comprising:
electrodes defining an ion optical path,
a housing for accommodating the electrodes,
a voltage source for providing voltages to the electrodes to produce electric fields, and
a valve for allowing gas to enter and/or leave the housing, wherein the valve comprises an electrostatic mechanism.

By providing an ion optical arrangement which has an electrostatic valve mechanism, the housing of the ion optical arrangement can be quickly opened or closed, thus avoiding conventional valves. As in some applications the primary function of a valve is to quickly release pressure, a valve in an ion optical arrangement may also be referred to as pressure release mechanism.

The electrostatic mechanism may comprise a flexible foil configured for covering at least one opening in the ion optical arrangement when a first voltage is applied and for being spaced apart from the at least one opening when a second voltage is applied. A flexible foil, which may have a thickness of less than 1 mm, preferably less than 0.2 mm, has very little mass and can quickly be moved.

The flexible foil may comprise at least one insulating layer and at least one conducting layer. In some embodiments, the flexible foil may comprise only a conducting layer. Typically, two insulating layers may be used to insulate the conducting layer from the conducting outer wall of the housing and from the conducting support element. Each of these two insulating layers may be attached to either the conducting layer or one of the housing and the support element. Flexible foils having more than one conductive layer, for example two or three conductive layers separated by insulating layers may also be used.

In an embodiment, the flexible foil is arranged in a spacing between the housing and a support element. That is, the flexible foil may cover a wall part of the housing which contains one or more openings. The support element may be a plate which preferably has a similar shape to the wall part of the housing so as to provide a substantially uniform spacing. The support element may therefore be flat or curved dependent on the shape of the housing. The support element is at least partially electrically conducting.

The ion optical arrangement according to the invention may further comprise a pump for pressurizing the ion optical arrangement. The pump may for example be used to pressurize the ion optical arrangement at least during a first operation mode in which it is used as a collision cell. The pressurizing pump may be switched off in a second operation mode in which no collision gas is used. In some embodiments, the pump may be reversed in the second operation mode.

In an embodiment, the ion optical arrangement may comprise a switchable pumping cross section in the collision cell housing for establishing a higher gas pressure inside the first operation mode (low cross section) and pumping the collision cell efficiently in the second operation mode (high cross section). The first operation mode may be a low energy mode while the second operation mode may be a high energy mode. That is, the ions passing through the collision cell may have a relatively low energy in the first operation mode when gas is present and a relatively high energy in the second operation mode, when virtually no gas is present.

The invention also provides an electrostatic valve for use in an ion optical arrangement, wherein the electrostatic valve comprises a flexible foil configured for covering at least one opening in the ion optical arrangement when a first voltage is applied and being spaced apart from the at least one opening when a second voltage is applied.

The invention further provides an ion optical arrangement for use in a mass spectrometer comprising:
electrodes defining an ion optical path,
a housing for accommodating the electrodes,
a voltage source for providing voltages to the electrodes to produce electric fields, and
a valve for allowing gas to enter and/or leave the housing, wherein the valve comprises a pneumatic mechanism.

A suitable pneumatic mechanism may provide a good alternative to an electrostatic mechanism. In an embodiment, the pneumatic mechanism comprises a Bourbon tube. A Bourdon tube, which is known per se, typically consists of a rounded or wound tube which straightens when inflated. An example of a Bourdon tube is disclosed in U.S. Pat. No. 3,188,419. A Bourdon tube, which can be operated by gas pressure, is capable of switching quickly.

In an embodiment, the Bourdon tube is arranged for opening the housing when inflated and closing the housing when deflated. The housing of the ion optical arrangement may comprise a hinged flap which is capable of closing off an opening in the housing, and the hinged flap being operated by the Bourdon tube.

The ion optical arrangement of the invention may be a collision cell or a collision/reaction cell. However, the invention is not so limited and the ion optical arrangement of the invention may be any ion guide of which the gas pressure is to be variable.

The invention additionally provides a pneumatic valve for use in an ion optical arrangement, comprising a hinged flap arranged for opening and/or closing at least one opening in the ion optical arrangement, and a Bourbon tube arranged to operate the flap.

In another embodiment, the valve mechanism may comprise a relay so as to electrically operate the mechanism. In some embodiments, a Bourdon tube and a relay may advantageously be combined.

The invention further provides a mass spectrometer comprising an ion optical arrangement as described above. The mass spectrometer according to the invention may further comprise at least one ion source, such as an inductively coupled plasma ion source, and at least one detector arrangement, such as a multi-collector detector arrangement, and preferably also a mass filter. The invention is, however, not limited to mass spectrometers having plasma sources.

It is noted that the ion optical axis along which ions pass through the ion optical arrangement may be straight but that this is not essential. In some embodiments, the ion optical axis through the collision cell is straight but the path of the ions through the ion optical arrangement may not be straight and may be partially or entirely curved, as in the arrangement of GB 2 546 060, for example.

DETAILED DESCRIPTION OF PREFERRED EMBODIMENTS

As mentioned above, it is an object of the present invention to allow an ion optical arrangement, such as a collision/reaction cell or a mass filter, to quickly switch between a pressurized state and a depressurized or vacuum state, or between a high pressure state and a low pressure state. Such an ion optical arrangement may also be referred to as switchable ion guide.

The pressurized state may for example be a state in which a collision gas is used, which may be a state in which the ions have a relatively low energy. The depressurized state may be a state in which a collision gas is not desired, which may be a state in which the ions have a relatively high energy.

When operating an ion optical arrangement, such as a collision cell, in a pressurized mode and in an evacuated (that is, non-pressurized) mode, it is typically required that the ion optical arrangement can be pressurized and depressurized rapidly. In particular, a pressure release mechanism is desired that is fast and effective.

Figure 1:
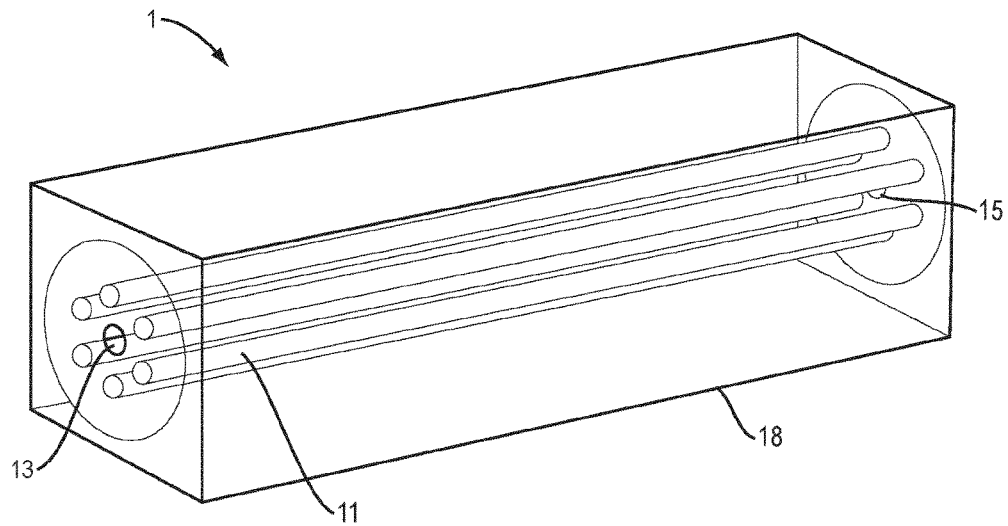
FIG. 1 schematically shows a multipole collision/reaction cell in which the invention may be utilized.

FIG. 1 schematically shows an ion optical arrangement in which the invention may be applied. The collision cell 1 is shown to comprise a housing 18 in which a multipole arrangement is accommodated. In the example shown, the multipole arrangement is a hexapole arrangement comprising six elongate poles or rods 11 which constitute electrodes. The multipole arrangement has an axis of symmetry which is the ion optical axis. A radio frequency (RF) voltage may be fed to opposite pairs of poles 11 to produce an RF electric field. Ions can enter the collision cell through an entrance aperture 13 and leave the collision cell through an exit aperture 15. The RF field produced by the multipole arrangement focuses the ions on the longitudinal axis of the arrangement. This is particularly relevant when a collision gas is present in the collision cell, as collisions may cause the ions to deviate from their path.

The invention provides valve mechanisms which are particularly suitable for use in a collision cell or other ion guide having a pressurized and an evacuated operation mode.

Figure 2A:
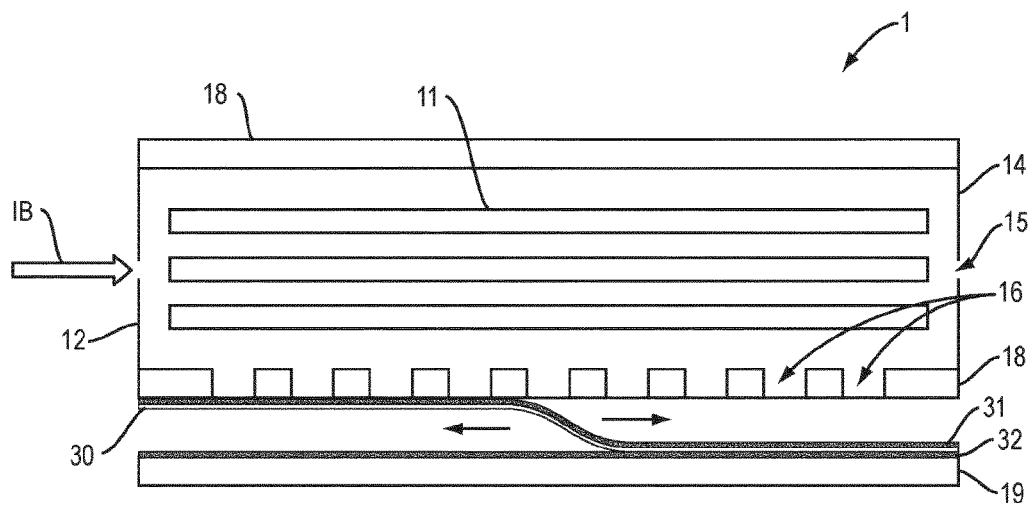
FIGS. 2A-2C schematically show an embodiment of an electrostatic pressure release mechanism which may be used with the collision/reaction cell of FIG. 1 or with another ion optical arrangement.

FIG. 2A schematically shows an electrostatic valve mechanism which may be used in a collision cell, for example. The exemplary collision cell 1 is shown to comprise a housing 18 in which rods 11 are accommodated. An ion beam IB can pass through the collision cell 1, through openings in the front plate 12 and back plate 14 respectively. In the embodiment shown, part of the wall of the housing 18 is provided with through holes 16 which can be closed off by a movable foil. This foil is located in a spacing between the housing 18 and a support element 19, which is here constituted by a plate. Both the housing 18 and the plate 19 contain electrically conductive material and may both be made of metal, or at least contain a metal layer or other conductive layer. The plate 19, which extends substantially parallel to the housing 18, may be flat but may alternatively be curved to accommodate any curvature of the housing 18.

In the embodiment shown, the foil comprises two layers: a conductive layer 30 and an electrically insulating layer 31. A further electrically insulating layer 32 is attached to the plate 19. In an alternative embodiment, the foil consists of a single layer: the conductive layer 30 only, in which case the insulating layers 31 and 32 are permanently attached to the housing 18 and the plate 19 respectively. In yet an alternative embodiment, the foil consists of three layers: the conductive layer 30 and both insulating layers 31 & 32. Further layers may be added, as long as the foil remains sufficiently flexible. A suitable material for the insulating layers 31 & 32 is Kapton, but other materials, for example other polyimides, may also be used. The conductive layer may be made of copper foil, for example.

As mentioned above, the flexible foil is located in the spacing between the housing 18 and the plate 19. One edge of the foil may be attached to the housing 18 while the opposite edge may be attached to the plate 19, such that the foil bridges the spacing. By applying DC voltages to the conductive layer, the position of the foils can be changed, as shown in FIG. 9A by the arrows which indicate the possible movement of the substantially S-shaped spacing-bridging portion of the foil.

Figure 2B:
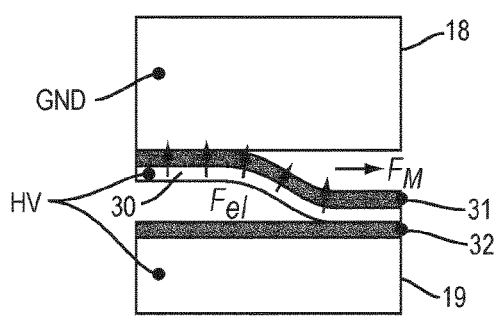

Referring to FIG. 2B, the housing 18 will typically be connected to ground (GND). The conductive plate 19 can be connected to a high voltage, indicated by HV in FIG. 9B, thus creating a voltage difference over the spacing between the housing 18 and the plate 19. If the conductive layer 30 is connected to a high voltage, then the foil will be repelled by the plate 19 and attracted by the housing 18. As a consequence, the foil will tend to move towards the housing and the S-shaped spacing bridging part will move to the right (see also FIG. 2A). In other words, electrical forces $F_{el}$ pulling the foil towards the housing cause a mechanical force $F_m$ to the right in FIG. 2B. The foil will cover the through holes 16 and the interior of the collision cell will be closed off.

Figure 2C:
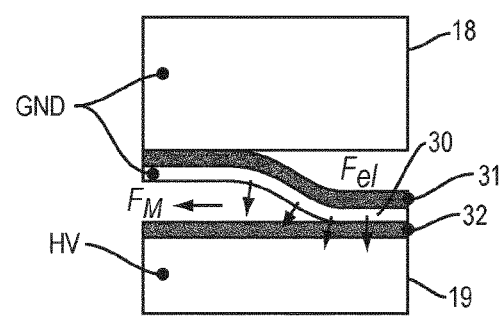

Referring to FIG. 2C, the through holes 16 can be opened by connecting the conductive layer 30 to ground instead of to the high voltage (HV). This will cause the foil to be repelled by the housing 18 and to be attracted by the plate 19, which in turn cause the S-shaped spacing bridging part to move to the left (see also FIG. 2A). In other words, electrical forces $F_{el}$ pulling the foil towards the plate 19 cause a mechanical force $F_m$ to the left in FIG. 2C. The foil will no longer cover the through holes 16 and the interior of the collision cell will be open to the surrounding atmosphere.

As the movement of the foil is controlled by voltages, which can be switched extremely quickly, and as the foil can have a very low mass, the movement of the foil can be very quick. Accordingly, the pressure inside the collision cell 1 can be adjusted very rapidly and switching between a pressurized state and an evacuated state can be carried out almost instantly.

Figure 3:
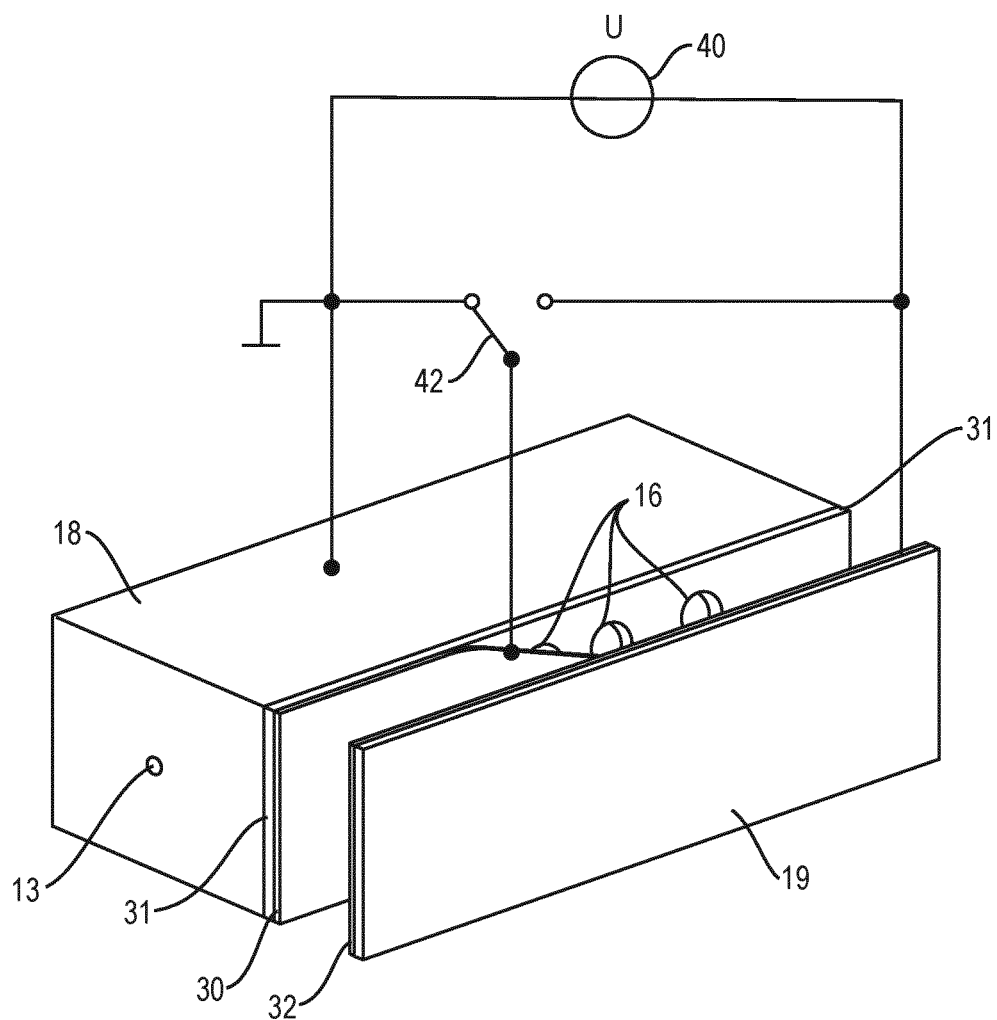
FIG. 3 schematically shows an ion optical arrangement with an electrostatic valve mechanism according to the invention.

An embodiment of the electrostatic valve is shown in perspective in FIG. 3, together with an ion guide and electric circuitry for operating the electrostatic valve. The ion guide is shown to have a housing 18 with an entrance opening 13 for ions. A flexible foil arrangement is shown to comprise a conductive layer 30, a first insulating layer 31 and a second insulating layer 32. In the embodiment shown, the insulation layers 31 and 32 are permanently attached to the housing 18 and the plate 19 respectively, the conductive layer 30 being the only movable layer. In some embodiments, two or more conductive layers may be used, separated by additional insulating layers.

In the embodiment shown, the openings 16 in the housing are also present in the first insulating layer 31. In embodiments where the first insulating layer 31 is not attached to the housing but to the conductive layer 30, the openings 16 may not be present in the first insulating layer 31.

FIG. 3 also schematically shows an electric circuit for operating the electrostatic valve. A voltage source 40 produces a voltage U. A switch 42 allows the conductive layer 30 to connect either to ground (as shown) or to the voltage U. The plate 19 is shown to be permanently connected to the voltage U. If the conductive layer 30 is connected to ground, as shown, it will be attracted to the plate 19 and move towards the plate. Conversely, if the conductive layer 30 is connected to the voltage source 40, then the conductive layer 30 will be repulsed by the plate 19 and move towards the housing 18, thus closing the openings 16.

Figure 4A:
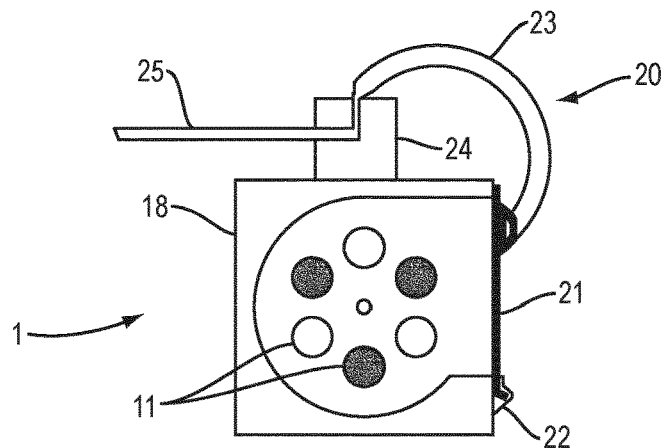
FIGS. 4A & 4B schematically show an embodiment of a pneumatic pressure release mechanism which may be used with the collision/reaction cell of FIG. 1 or with another ion optical arrangement.
Figure 4B:
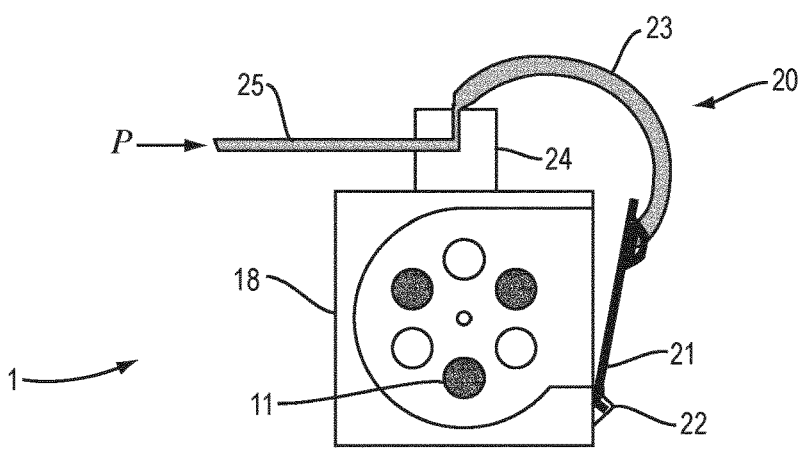

FIGS. 4A & 4B show a pneumatic mechanism 20 for adjusting the pumping cross section of an ion guide, for example a collision cell housing 18 having rods 11. The pneumatic valve mechanism 20 is shown to comprise a door or flap 21 which is connected via a hinge 22 to the housing 18 of the collision cell 1. The flap 21 can be operated by an actuator 23 of which one end is connected to the flap 21 and the other end is connected to a support element 24 attached to the housing 18.

The actuator 23 shown in FIGS. 4A & 4B is a Bourdon tube. A Bourdon tube comprises a bent tube. The bending radius of the bent tube can be decreased if the pressure difference between the inner part and the outer part of tube increases. To this end, a gas tube 25, which is also connected to the support element 24, is connected with the actuator 23. In the embodiment shown, the gas flows from the gas tube 25 through a channel in the support element 24 into the actuator 23 when the gas pressure in the gas tube 25 is higher than the gas pressure surrounding the actuator 23. By letting gas flow into the actuator, its bending radius decreases (the actuator straightens) and the flap is opened. Conversely, the gas flows from the actuator 23 through the support element 24 into the gas tube 25 when the gas pressure in the gas tube 25 is lower than in the actuator 23. By letting gas flow out of the actuator, its bending radius increases (the actuator curves) and the flap is closed.

Thus, by providing a pressure difference between the gas tube 25 and the air (or other gas) outside the actuator 23, the flap can be quickly opened or closed, thus allowing the gas pressure in the interior of the collision cell 1 to quickly assume the gas pressure on its outside.

It is noted that the collision cell 1 may be accommodated in a near-vacuum environment, while the gas tube may be connected with an environment under atmospheric pressure. The gas used for inflating the inflatable actuator may be air. As the interior volume of the actuator 23 and the gas tube 25 may be small, only a small amount of air or other gas is needed to inflate the actuator. This air or other gas may be provided by a gas reservoir or by a pump. Thus, a small pump or valve can be sufficient to indirectly operate the relatively large flap.

By using a Bourdon tube or similar actuator, a fast and effective pressure regulation of a collision cell or other ion guide can be achieved.

Figure 5:
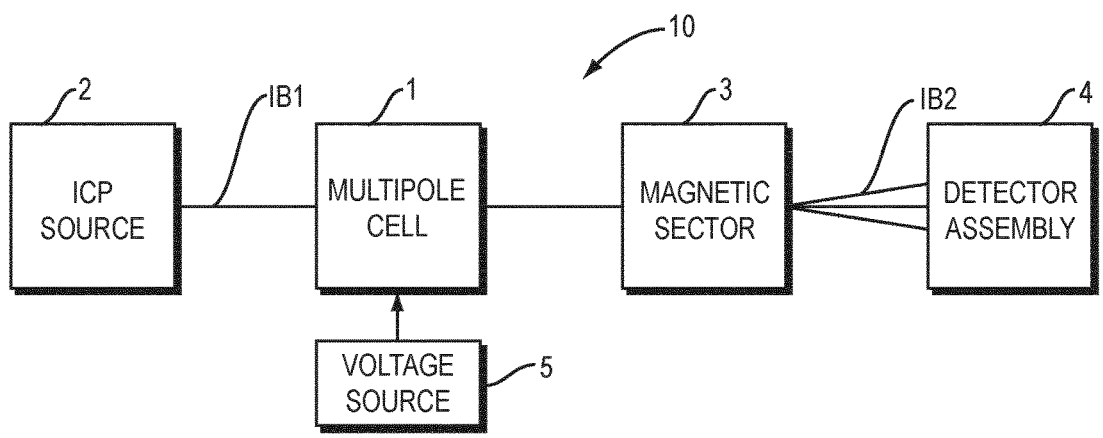
FIG. 5 schematically shows a mass spectrometer comprising an ion optical arrangement in accordance with the invention.

The exemplary mass spectrometer 10 schematically shown in FIG. 5 comprises a multipole cell 1, which can be a collision cell as described above but which can be replaced by an ion guide without a multipole arrangement. The mass spectrometer 10 may further comprise a plasma source 1, such as an ICP (inductively coupled plasma) source for generating an ion beam IB1. The mass spectrometer may further comprise a mass filter 3, such as a magnetic sector mass filter. In the magnetic sector mass filter, the ion beam 1131 is separated into partial beams IB2 having different m/z (mass versus charge) ratios, which partial beams can be detected by the detector assembly 4, which may be a multiple detector assembly. The mass spectrometer 10 may further comprise a pump for lowering the gas pressure in the collision cell 1, a valve associated with the pump, a voltage source 5 for supplying DC and AC (RF) voltages to the collision cell 1, and a controller for controlling the various components of the mass spectrometer 10. The voltage source 5 may correspond with the voltage source 40 in FIG. 3. The valve may comprise a foil-based valve and/or a Bourdon tube-based valve as described above.

Aspects of the invention comprise:
a) An ion guide, such as a multipole collision cell, which can be rapidly switched between a first operation mode, in which a collision gas and/or reaction gas is present, and a second operation mode, in which no gas is used.
b) Mechanisms for allowing a rapid switch between the first operation mode and the second operation mode.

These aspects of the invention may be used in isolation or in combination.

Although the invention has been described above mainly with reference to an ion optical arrangement comprising a multipole, such as a hexapole, the invention is not so limited and may also be utilized in other types of ion guides.

It will therefore be understood by those skilled in the art that the invention is not limited to the embodiments shown and that many additions and/or modifications can be made without departing from the scope of the invention as defined in the appending claims.

The invention claimed is:

1. An ion optical arrangement for use in a mass spectrometer, comprising:
electrodes defining an ion optical path,
a housing for accommodating the electrodes, the housing including an entrance aperture for ions to enter, an exit aperture for ions to exit, and multiple through holes for gas to exit,
a voltage source for providing voltages to the electrodes to produce electric fields, and
a valve for allowing gas to leave the housing, wherein the valve comprises an electrostatic mechanism; and
wherein the electrostatic mechanism comprises a flexible foil arranged in a spacing between the housing and a support element, the electrostatic mechanism configured for covering the multiple through holes in the housing when a first voltage is applied to the flexible foil and being spaced apart from at least a portion of the multiple through holes to provide a flow path for gas to flow through the multiple through holes and out at least one edge of the flexible foil when a second voltage is applied to the flexible foil.

2. The ion optical arrangement according to claim 1, wherein the flexible foil comprises at least one insulating layer and at least one conducting layer.

3. The ion optical arrangement according to claim 1, further comprising a pump for pressurizing the ion optical arrangement.

4. The ion optical arrangement according to claim 1, which is a collision cell or a collision/reaction cell.

5. A mass spectrometer comprising an ion optical arrangement according to claim 1.

6. The mass spectrometer according to claim 5, further comprising at least one ion source, and at least one detector arrangement.

* * * * *